United States Patent
Dholakia et al.

(10) Patent No.: US 7,979,082 B2
(45) Date of Patent: Jul. 12, 2011

(54) METHOD AND APPARATUS FOR MESSAGE IDENTIFICATION

(75) Inventors: Ajay Dholakia, Cary, NC (US); John G. Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 11/930,680

(22) Filed: Oct. 31, 2007

(65) Prior Publication Data

US 2008/0102799 A1     May 1, 2008

(30) Foreign Application Priority Data

Oct. 31, 2006    (EP) .................................. 06123276

(51) Int. Cl.
*H04M 4/00*     (2006.01)
(52) U.S. Cl. ..................... 455/466; 455/422.1; 70/206
(58) Field of Classification Search .............. 455/466, 455/412.1, 412.2; 709/206–207
See application file for complete search history.

(56) References Cited

U.S. PATENT DOCUMENTS

| | | |
|---|---|---|
| 2003/0083078 A1 | 5/2003 | Allison |
| 2004/0093384 A1 | 5/2004 | Shipp |
| 2005/0278620 A1* | 12/2005 | Baldwin et al. ............... 715/513 |
| 2006/0036693 A1 | 2/2006 | Hulten |
| 2006/0149820 A1 | 7/2006 | Rajan et al. |

FOREIGN PATENT DOCUMENTS

WO    WO 2006063944     6/2006

* cited by examiner

*Primary Examiner* — Kamran Afshar
(74) *Attorney, Agent, or Firm* — William Stock; Anne Vachon Dougherty

(57) ABSTRACT

A method and apparatus for identifying an unwanted short message service (SMS) message from SMS messages received by a cellular mobile communication system, which comprises at least a history database (HB) for storing a set (H) of the messages received by the cellular mobile communication system. The method includes the steps of: measuring a difference in an information content between a SMS message (m) received by the cellular mobile communication system and the set (H) of messages stored in the history database (HB), and marking the SMS message (m) as being an unwanted SMS message if the difference that is measured is less than or equal to a predefined threshold value.

20 Claims, 4 Drawing Sheets

METHOD AND APPARATUS FOR MESSAGE IDENTIFICATION

FIELD OF THE INVENTION

The present invention relates to a method and an apparatus for message identification. In particular, the present invention relates to a method and an apparatus for the identification of unsolicited and/or unwanted messages received in a cellular mobile communications environment.

BACKGROUND OF THE INVENTION

A known problem in electronic mailing systems is the receipt of unsolicited and/or unwanted electronic mail messages by a large number of users of such systems. Such messages are typically known as spam. There is no formal standard as such for classifying whether an electronic mail message is spam or not. However, if a message contains a keyword that is considered to be suspicious and/or common to a large volume of electronic mail messages that have been sent to multiple users, then that message may potentially be spam. Electronic mail messages that are spam are differentiated from legitimate messages intended for a respective user.

A drawback associated with spam is that such messages occupy storage space in an electronic mailing system and/or individual mailboxes of users of that system, which may prevent the receipt of legitimate messages. A further drawback associated with spam is that such messages may often be used to propagate viruses and the like, which may cause more serious malfunctioning of the system and/or user machines connected thereto. Deleting spam is time-consuming and may also be error prone resulting in the deletion of legitimate messages.

For the identification and removal of spam in the electronic mailing environment, it is known to use Bayesian filters. Such filters rely on an initial training phase where a newly-received electronic mail message is first analyzed by a human to separate those words in its content that are known to be and/or occur in spam and those words that are legitimate. These results are used in the Bayesian filter to adjust individual probabilities as to whether a word in the newly-received and now analyzed electronic mail message will appear in subsequently-received spam or legitimate electronic mail messages. These individual probabilities are then used to compute an overall probability of whether a subsequently-received electronic mail message with a specific set of words is spam or not. A threshold may be specified, which if exceeded by the overall probability, denotes that the electronic mail message is spam. That message may then be removed or allocated to another database dedicated for storing spam.

Given that the size of electronic mail messages and the number of such messages that are processed by an electronic mailing system per second may be relatively large and the level of analysis, as described above, that is performed on each of such messages by the Bayesian filter for the identification of spam, such a filter is typically implemented and operated in the machine of an individual user and/or in the mail server of such a system at a specific site.

The use of Bloom filters, which are space-efficient representations of sets, in database and network applications can be found in: "Network applications of Bloom filters: A survey" by Andrei Broder and Michael Mitzenmacher, "Content-based overlay networks of XML peers based on multi-level bloom filters" by Georgia Koloniari et al, and "Distance-sensitive bloom filters" by Adam Kirsch and Michael Mitzenmacher. These documents are accessible on the respective web pages for eecs.harvard.edu/~michaelm/NEWWORK/postscripts/BloomFilterSurvey.pdf, cs.uoi.gr/~pitoura/distribution/p2pw03.pdf, eecs.harvard.edu/~michaelm/postscripts/alenex2006.pdf.

It is anticipated that spam will pose a problem in mobile communications systems comparable to that described above in the context of electronic mail messaging. This is especially so since the short messaging service (SMS) by way of which messages are typically transmitted to and from mobile phones may also be automatically generated by and sent to mobile phones from Internet-connected computers, for example. The content of an SMS spam message may, for example, be, "Please phone this telephone number" whereby the telephone number is more expensive to call than other telephone numbers and would accordingly result in a higher telephone-bill being incurred by the owner of the mobile phone than would usually be the case.

Differences exist between electronic mail messages and SMS messages. Firstly, unlike electronic mail messages that may be routed to a user via an arbitrary mail server, SMS messages are transmitted to a user through a mobile phone operator with which that user is registered, this being done via a switching centre associated to the operator. If, for example, an SMS message is received by a mobile phone operator, the message being destined for a mobile managed by another operator, then the message is sent on to that other operator. Thus, unlike for electronic mail messages where a spam filter may be executed on an arbitrary mail server, only a mobile phone operator may be able to implement and execute an SMS spam filter. Furthermore, SMS messages typically have fewer characters than electronic mail messages. Specifically, the maximum length of an SMS message is 160 characters, which is mapped to 140 bytes. Due to the size constraints posed on SMS messages, it is expected that the volume of SMS messages processed per second by a mobile phone operator is higher than by a mail server.

For the identification of spam SMS messages, the following factors may have to be taken into account. SMS messages have a limited size and therefore there is restricted scope for incorporating spam in the content of an SMS message and the manner in which this is done. Thus, a less complicated analysis of SMS messages compared to what is done for electronic mail messages may be needed in order to identify spam. Also, spam SMS messages are typically transmitted by gaining unauthorized access to the cellular network. Since the cellular network is closed, such unauthorized access could only be gained for a limited time, that is, it is more likely that a large volume of SMS spam messages of the same/similar content are transmitted in a limited time-window. Furthermore, spam identification may only be done centrally at the mobile phone operator, which typically processes a larger volume of messages than a mail server. Taking these factors and the above discussion into account, Bayesian filters, whilst being suitable for spam identification in electronic mail messaging systems, may not be suitable for this purpose in mobile communications systems.

Accordingly, it is desirable to provide a method and an apparatus for identifying spam in SMS messages that may be implemented centrally by a mobile phone operator and that may perform such identification in a manner that is compatible with the number of SMS messages typically processed per second by such an operator and the typical size constraints associated to SMS messages.

SUMMARY OF THE INVENTION

According to an embodiment of a first aspect of the present invention, there is provided a method of identifying an unwanted short message service (SMS) message from SMS messages received by a cellular mobile communication system, which comprises at least a history database for storing a set of the messages received by the cellular mobile communication system, the method comprising the steps of: measuring a difference in an information content between a SMS message received by the cellular mobile communication system and the set of messages stored in the history database, and marking the SMS message as being an unwanted SMS message if the difference that is measured is less than or equal to a predefined threshold value. By determining whether an incoming message has the same/similar information content as other messages received in the same queue and which are stored in the history database, the messages that are received by the cellular mobile communication system are used to identify and build up knowledge of spam SMS messages. Thus, an embodiment of the present invention is different from other previously-proposed spam identification techniques such as, for example, Bayesian filtering and general-content-based schemes that have been applied in the context of identification of spam electronic mail messages since these techniques rely on human intervention to build up a knowledge of what constitutes spam.

An embodiment of the present invention is particularly suited for application in the context of SMS spam identification since spam SMS messages propagated by the same person, hereinafter referred to as a spammer, will typically have the same/similar information content and will, therefore, look like each other. This is the case even if the spammer tries to obfuscate messages by, for example, replacing an "S" with "$" because SMS messages have a maximum length of 160 characters and so there are only limited ways in which to obfuscate messages. Furthermore, a spammer sending spam SMS messages does so by gaining unauthorized access to the cellular network. Since the cellular network is closed, such unauthorized access could only be gained for a limited time, that is, it is more likely that a spammer sends a large volume of SMS spam messages of the same/similar content in a single burst. Thus, given the above factors, namely, the limited size of an SMS message and the limited access a spammer has to the cellular network in which to propagate spam, an embodiment of the present invention configured to, for example, place some of the messages in a burst in the history database and compare a message received in the same burst will likely flag that message as a spam SMS message if it is such a message.

In the event that a spammer generates spam with increased frequency and/or volume, the history database will largely contain messages having the same/similar information content and the probability of a match being obtained with a message/next batch of messages that are processed will also increase. Thus, the effectiveness of an embodiment of the present invention in identifying a spam SMS message increases when a spammer generates spam with increased frequency and/or volume.

Preferably, an embodiment according to the first aspect of the present invention further comprises the step of: updating the messages stored in the history database with the SMS message if the difference in the information content between the SMS message and the set of messages stored in the history database is measured to be more than the predefined threshold value. In the event that the measured difference between the SMS message received by the cellular mobile communication system and the set of messages stored in the history database is more than the predefined threshold value, then this message would be marked as a legitimate message and transmitted on to a user registered with the cellular mobile communication system and for whom the message is destined. Thus, although an embodiment of the present invention does not guarantee identifying spam SMS messages, at least initially, it develops knowledge of what may/may not be/may potentially be spam on the basis of messages received by the cellular mobile communication system.

Desirably, an embodiment according to the first aspect of the present invention further comprises the steps of: measuring a difference in the information content between the SMS message received by the cellular mobile communication system and at least one unwanted message stored in the spam database, and if they are found to be identical, marking the SMS message as an unwanted message. In an embodiment of the present invention, the cellular mobile communication system may be provided with a database dedicated to storing messages identified as spam SMS messages, such a database being hereinafter referred to as a spam database. Like the history database, the spam database is initially empty. It is used to store received messages that are found to have the same/similar information content as a set of messages stored in the history database, this being determined as discussed above. Once the spam database is populated with at least one message, the messages received by the cellular mobile communication system may first be compared to the message in the spam database. If a match is found, then the received message may be marked as a spam SMS message. If no match is found, then the received message is forwarded for comparison with the set of messages stored in the history database. In this way, the time taken to identify spam SMS messages may be reduced.

Preferably, an embodiment according to the first aspect of the present invention further comprises the step of discarding at least some of the messages stored in the history database and/or the spam database after a predefined time. As discussed previously, a spammer gains unauthorized access to a cellular network and propagates spam by generating multiple messages of the same/similar information content and sends them consecutively in a burst. The contents of the burst are used in an embodiment of the present invention for compiling the history database and, therefore, the spam database. Once the contributions of a burst have been factored in, messages in the history database and the spam database are discarded. In this way, the history and/or spam database in an embodiment of the present invention evolves in order to create storage space for messages in the next burst in the queue and, therefore, identify a new-generation of spammer(s). This dynamic aspect of an embodiment of the present invention is advantageous also in the light of the storage capability of the history database and/or spam database in an embodiment of the present invention being limited in comparison to the number of SMS messages a cellular mobile communication system typically receives, which may be on the order of a billion messages per month, for example.

Desirably, an embodiment according to the first aspect of the present invention further comprises the step of sampling the messages received by the cellular mobile communication system for inclusion in the history database. In this way, an embodiment of the present invention is able to process the large volume of SMS messages that are typically received by a cellular mobile communication system whilst accommodating the possibly variable sizes of bursts in a queue without the need to use a history database of increased storage capacity.

Preferably, in the step of measuring the difference in the information content between the SMS message received by the cellular mobile communication system and the set of messages stored in the history database, the set of messages comprises a subset of the messages stored in the history database. In this way, the messages received by the cellular mobile communication system are processed in a time-efficient manner.

In the case that the set of messages comprises a subset of the messages stored in the history database, the number of messages in the subset is preferably selected to be a function of a time-budget. Typically, a time-budget is imposed on a cellular mobile communication system in which to process and forward each incoming message to a user. In this regard, it could, for example, be that there are 10 seconds available in which an incoming message should be processed and forwarded on. However, if it takes 1 second to compare an incoming message with a message in the subset of messages in the history database and the subset comprises 100 messages, then the message will be forwarded on after 100 seconds, which does not meet the imposed 10 second time-budget. In order to meet such a time-budget, an embodiment of the present invention may be configured so that the incoming message is compared to a number of messages in the subset in a time corresponding to the time-budget. In the current example, this would mean that the incoming message is compared to 10 messages in the subset. The messages in the subset against which the comparison is performed may be chosen randomly.

Desirably, in an embodiment according to the first aspect of the present invention, the difference in the information content between the SMS message and a message occurring with a predetermined frequency in the set of messages stored in the history database is measured. Since the incoming message is not compared to all of the messages in the set of messages stored in the history database, the time taken to identify a spam message is reduced.

Alternatively, the difference in the information content between the SMS message and the messages in the set of messages stored in the history database may be measured, and if the difference that is measured is less than or equal to the predefined threshold value for a predefined number of messages in the set of messages stored in the history database, then the SMS message is marked as an unwanted SMS message. In this manner, the processing resources for identifying spam may be used more efficiently.

Desirably, the cellular mobile communication system comprises a switching centre of a mobile telephone operator. By implementing an embodiment of the present invention at a switching centre of a mobile phone operator, spam identification may be done centrally.

Desirably, in the step of measuring the difference in the information content between the SMS message received by the cellular mobile communication system and the set of messages stored in the history database: a Hamming distance between a bloom filter computed for the SMS message and a bloom filter computed for a message in the set of messages stored in the history database is measured. In this way, the similarity in information content between an incoming message and a set of messages in the history database can be done in a manner that is space-efficient and compatible with the volume of messages to be processed by the cellular mobile communication system.

Preferably, in the step of measuring the difference in the information content between the SMS message received by the cellular mobile communication system and the set of messages stored in the history database: a Hamming distance between a bloom filter computed for the SMS message and a bloom filter computed for at least a part of a message in the set of messages stored in the history database is measured. In this way, comparison of the information content of an incoming message with the set of messages stored in the history database is done in a time-efficient manner.

Preferably, if the Hamming distance is measured to be less than or equal to the predefined threshold value for a user-defined number of messages in the set of messages stored in the history database, then the SMS message is marked as an unwanted message. By way of this feature, the scenario where a legitimate incoming message, which may, nevertheless, have the same/similar information content as a message/a few messages in the set stored in the history database is marked a spam message is avoided.

Corresponding apparatus aspects of the invention are provided, and thus according to an embodiment of a second aspect of the present invention, there is provided an apparatus for identifying an unwanted short message service (SMS) message from SMS messages received by a cellular mobile communication system, the apparatus, when in use, being coupled to the cellular mobile communication system that comprises at least a history database for storing a set of the messages received by the cellular mobile communication system, the apparatus comprising: a comparator operable to measure a difference in an information content between a SMS message received by the cellular mobile communication system and the set of messages stored in the history database.

According to an embodiment of a third aspect of the present invention, there is provided a cellular mobile communication system configured to operate the method according to the first aspect of the present invention and/or comprising an apparatus according to the second aspect of the present invention.

In any of the above aspects, the various features may be implemented in hardware, or as software modules running on one or more processors.

According to an embodiment of a fourth aspect of the present invention, there is provided a computer program comprising instructions for carrying out the steps of the method according to the first aspect of the present invention when the computer program is executed on a computer system.

Any of the method features may be applied to the apparatus aspect of the invention and vice versa. Features of one aspect may be applied to any other aspect.

DESCRIPTION OF THE DRAWINGS

Reference will now be made, by way of example, to the accompanying drawings, in which.

DETAILED DESCRIPTION OF THE INVENTION

Figure 1:
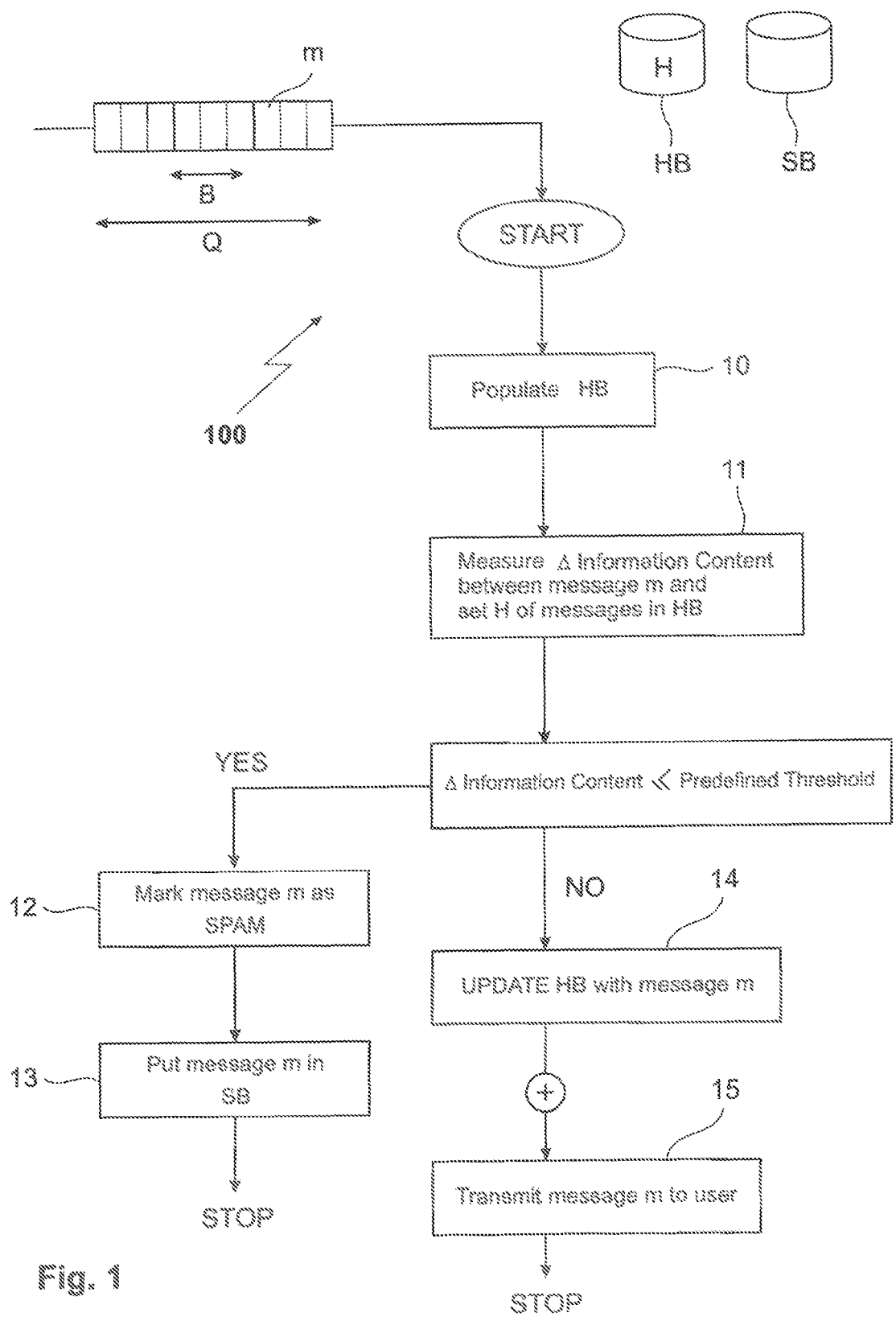
FIG. 1 schematically illustrates an embodiment of the present invention.

Within the description, the same reference numerals or signs are used to denote the same parts or the like.

Reference is now made to FIG. 1, which schematically illustrates an embodiment of the present invention.

An embodiment of the present invention may be implemented in a cellular mobile communication system 100 comprising a switching centre of a mobile phone operator, which receives SMS messages for users registered with that operator. The SMS messages that are to be processed by the cellular mobile communication system 100 are typically received in a queue Q and are processed in "bursts" B by the cellular mobile communication system 100, where each burst B comprises a group of SMS messages received in a specific time-window.

In an embodiment of the present invention, the cellular mobile communication system 100 comprises at least a history database HB for storing at least some of the SMS messages that are received for processing by the cellular mobile communication system 100 and a spam database SB for storing SMS messages identified as spam. The history database HB and the spam database SB are initially empty.

Processing of the received SMS messages for spam identification is begun by populating the history database HB, this step being denoted by the reference numeral 10 in FIG. 1. This is done by placing some of the SMS messages in the queue Q received by the cellular mobile communication system 100 in the history database HB. The messages that are placed in the history database HB is configurable by the user. For example, it may be chosen that the SMS messages in a burst B are stored in the history database HB. Some bursts B in the queue Q may be longer than others, this being due to, for example, access to the cellular network being longer for some users than others for the transmission of messages. In order that the longer bursts B may be handled by an embodiment of the present invention without the need to increase the storage capability of the history database HB, messages may be randomly selected from the queue Q for inclusion in the history database HB. It could also be, for example, that messages of a user-chosen number and/or occurring in a predefined sequence from different bursts B in the queue Q are stored in the history database HB, this being done via a sampling step. For example, the sampling could be done so as to pick 1 message out of 1000 messages in each burst B, and/or occurring in a predefined sequence, for example, the first message of the first 1000 messages in each burst B. In this way, the large volume of SMS messages that are typically received by a cellular mobile communication system 100 may be processed for spam identification whilst accommodating the possibly variable sizes of bursts B in a queue Q without the need to use a history database HB of increased storage capacity.

Then, in order to determine whether a SMS message m received by the cellular mobile communication system 100 and present in the queue Q is a spam SMS message, a difference in the information content represented in binary form between that message m and a set H of SMS messages stored in the history database HB is measured, that is, their binary similarity is determined. This step is denoted by the reference numeral 11 in FIG. 1. In this regard, the set H of messages may comprise: all of the messages stored in the history database HB or a subset of the messages stored in the history database HB. For example, the subset may comprise messages in a burst B, at least some of the messages in a burst B or messages picked from different bursts B. The subset may be further qualified in that it is chosen to be a function of a time-budget that is typically imposed on a cellular mobile communication system 100 in which to process and forward each incoming message to a user.

In the step (11) of measuring the difference in the information content between the message m and the set H of messages stored in the history database HB, the message m may, of course, be compared to each of the messages in the set H. However, in this case, it may be that spam identification is not done within the time-budget imposed on the cellular mobile communication system 100 for processing and forwarding messages to users. This may be circumvented by the set H of messages stored in the history database HB being analyzed to see if it contains a message that occurs with increased frequency compared to other messages in the set H where the frequency value is user-set. If such a message is found, it is likely that it is a spam SMS message and the incoming message m is compared to such a message.

If the result that the difference between the SMS message m and the set H of messages in the history database HB is less than or equal to a predefined threshold value is obtained, then that message m is marked as a spam message as denoted by reference numeral 12. The predefined threshold value is user-set. The message m is then moved to the spam database SB as denoted by reference numeral 13. Optionally, it may also be forwarded on to a user encapsulated with a warning that it has been identified as a spam message. The encapsulation may be done such that, on opening the message, only the warning part of the message is opened initially warning the recipient that the message has been identified as spam.

An embodiment of the present invention may be configured by a user such that, if an incoming message m is found to have the same/similar information content as a predefined number, which is user-set, of messages in the set H of messages stored in the history database HB, then it is marked as a spam message. In this manner, the processing resources for identifying spam may be used more efficiently.

By determining whether an incoming message m has the same/similar information content as other messages received in the same queue Q and which are stored in the history database HB, the messages that are received by the cellular mobile communication system 100 are used to identify and build up knowledge of spam SMS messages.

If the measured difference between the SMS message m and the set H of messages stored in the history database HB is more than the predefined threshold value, then this message would be marked as a legitimate message and transmitted on to a user registered with the cellular mobile communication system 100 and who the message is destined for as denoted by reference numeral 15. Such a user is identified by the telephone number on which that message is received. Also, as denoted by reference numeral 14, the history database HB is updated to include this message for its future use in determining whether or not subsequently processed messages are spam or not. For example, it could be that the difference between the message m which the history database HB is updated with and a subsequently-processed message is less than the predefined threshold value. In this case, the latter message may be placed in a bin where it is temporarily held and not discarded or marked as spam as it may still be a legitimate message. It may even be marked as potentially being a spam message. If, however, the difference between the message m with which the history database HB is updated and a user-set number of messages in the queue Q that are subsequently processed is less than the predefined threshold value, then those messages together with the message in the temporary bin could be marked as spam and discarded/moved to the spam database SB. Thus, although an embodiment of the present invention does not guarantee identifying spam SMS messages, at least initially, it develops knowledge of what may/may not be/may potentially be spam on the basis of messages received by the cellular mobile communication system. From the previous discussion it can be seen that an embodiment of the present invention may bear the risk of forwarding a spam message to a user at an initial stage.

Figure 2:
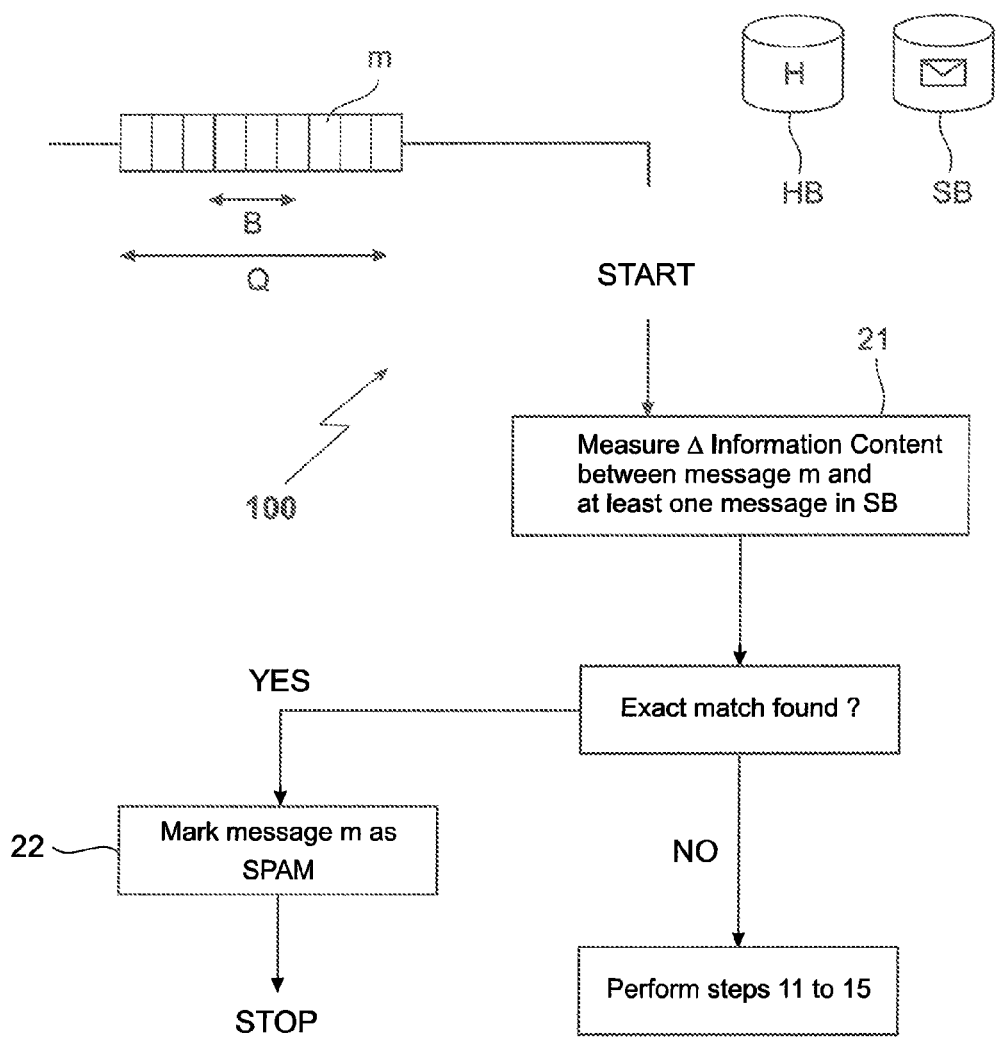
FIG. 2 schematically illustrates an embodiment of the present invention when the spam database SB is populated with at least one message.

Reference is now made to FIG. 2, which shows an embodiment of the present invention when the spam database SB is populated with at least one message.

As discussed previously, the spam database SB is initially empty. It is used to store received messages that are found to have the same/similar information content as a set H of messages stored in the history database HB, this being determined as discussed above with reference to FIG. 1. Once the spam database SB is populated with at least one message, the messages received by the cellular mobile communication system 100 may first be compared to the message in the spam database SB, this being denoted by reference numeral 21. If an exact match is found, then the received message may be marked as a spam SMS message, this being denoted by reference numeral 22. If no match is found, then the received message is forwarded for comparison with the set H of messages stored in the history database HB as described above with reference to FIG. 1. It could also be that, once the spam database SB is populated with at least one message, an embodiment of the present invention may be configured to simultaneously compare a message m received by the cellular mobile communication system 100 to the message in the spam database SB and messages stored in the history database HB. In this way, incoming messages may be processed in a time-efficient manner.

Typically a spammer gains unauthorized access to a cellular network and propagates spam by generating multiple messages of the same/similar information content and sends them consecutively in a burst B. The contents of the burst B are used in an embodiment of the present invention for compiling the history database HB and, therefore, the spam database SB. Although not shown in FIG. 2, in an embodiment of the present invention, once the contributions of a burst B have been factored in, messages in the history database HB and the spam database SB are discarded. The messages are discarded after a predefined time, which may, for example, be proportional to the size of a burst, time duration of a burst or a combination thereof. In this way, the history and/or spam database in an embodiment of the present invention evolves in order to create storage space for messages in the next burst B in the queue Q and, therefore, identify a new-generation of spammer(s). This dynamic aspect of an embodiment of the present invention is advantageous also given the storage capability of the history database HB and/or spam database SB in an embodiment of the present invention being limited in comparison to the number of SMS messages a cellular mobile communication system 100 typically receives, which may be on the order of a billion messages per month, for example.

As discussed above, some of the messages received by the cellular mobile communication system are used to populate the history database HB. Since, and as also discussed above, a cellular mobile communication 100 typically receives on the order of a billion messages per month, it is desirable that the storage of messages in the history database HB is done in a manner that is compact and facilitates ease of comparison with an incoming message m that is to be processed. In this regard, in an embodiment of the present invention, a Bloom filter is computed for each of the messages in the set H of messages in the history database HB against which the comparison is to be performed. A Hamming distance between a Bloom filter computed for the incoming message m and each of the Bloom filters computed for the messages in the history database HB is then measured. If, for example, the Hamming distance between the Bloom filter computed for the incoming message m and those of "N" number of messages in the history database HB is less than or equal to the predefined threshold value, then the message m is marked as a spam message and forwarded to the spam database SB. In this case, the predefined threshold value is user-chosen and reflects the number of bits by which two equal length bit strings differ, e.g. the number of words by which the incoming message m differs from a message in the set H of messages stored in the history database HB. Units other than word boundaries may be used to determine the difference in the information content of an incoming message and a message to which it is compared in the history database HB, the units that are chosen being user-configurable. In the present case, "N" is a user-defined number and is a value chosen to avoid the scenario where a legitimate incoming message, which may, nevertheless, have the same/similar information content as a message/a few messages in the set H of messages stored in the history database HB is marked a spam message.

It is, of course, desirable that comparison of the information content of an incoming message m with the set H of messages stored in the history database HB is done in a time-efficient manner. In this regard, a Bloom filter is computed for a part of each message in the set H of messages contained in the history database HB and the Hamming distance difference with respect to a Bloom filter computed for the incoming message m is measured. In this case, a Bloom filter is computed for a continuous sequence of "c" alphanumeric characters of a message in the set H of messages stored in the history database HB, where "c" is a user-configurable number and the sequence boundaries do not necessarily correspond to word boundaries in the message.

Figure 3:
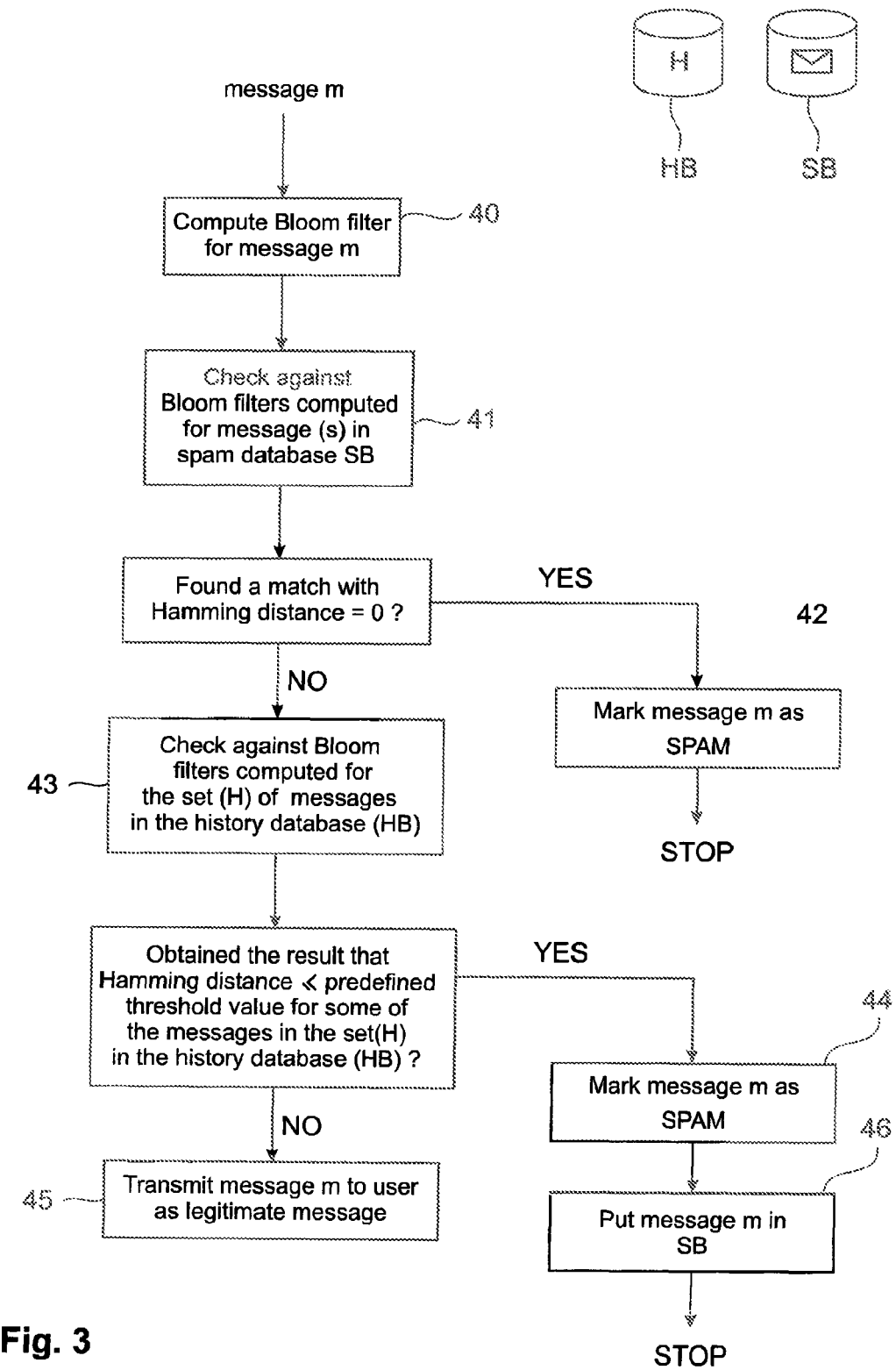
FIG. 3 schematically illustrates an embodiment of the present invention using a Hamming distance-Bloom filter configuration, and FIG. 4 schematically illustrates an apparatus embodying the present invention.

Reference is now made to FIG. 3, which schematically illustrates an embodiment of the present invention using the Hamming distance-Bloom filter implementation as described above. In the present example, the assumption is made that the spam database SB contains at least one spam message identified by the procedure discussed with reference to FIG. 1. Specific detail on Bloom filters and how they are computed is not given as this would be known to the person skilled in the art.

A Bloom filter is computed for an incoming message m that is to be processed by the cellular mobile communication system 100 as denoted by reference numeral 40. The Hamming distance between the Bloom filter for the message m and that computed for the message(s) stored in the spam database SB is then measured, as denoted by reference numeral 41. If an exact match is found, i.e. the Hamming distance that is measured is 0 then the message m is a spam message and is marked as such as denoted by the reference numeral 42. If no match is found, then the Hamming distance between the Bloom filter computed for the message m and those computed for the messages in the set H of messages stored in the history database HB is measured, as denoted by reference numeral 43. In this case, Bloom filter computation for the set H of messages in the history database may be done for all of the messages in the set H or a part thereof, where the latter may be chosen by averaging the messages in the set H, for example. Furthermore, and as described above, Bloom filter computation may be done for part/all of the content of the messages in the set H in the history database HB. If the result that the measured Hamming distance is less than or equal to the threshold value predefined by the user for some of the messages in the set H of messages stored in the history database HB, e.g. a user-defined number "N" as described above, then the message m is marked as spam in a step denoted by reference numeral 44 and forwarded to the spam database SB in a step denoted by reference numeral 46. If the result that the measured Hamming distance is more than the predefined threshold value is obtained, then the message m is transmitted to a user as a legitimate message as denoted by reference numeral 45. Although not shown, the step of updating the history database HB with message m and the step of discarding the messages stored in the history database HB and/or the spam database SB after a predefined time, as discussed with reference to FIGS. 1 and 2, would also be performed in the present case.

An embodiment of the present invention using the Hamming distance-Bloom filter implementation bears the risk that the advantage of space efficiency in storing and processing the messages received by the cellular mobile communication system 100 for spam identification may come at the expense of a probability of a false positive detection, i.e. a legitimate message being wrongly identified as a spam message in an embodiment of the present invention. The probability of this occurring is given by: $(1-(1-1/m)^k n)^k$ where m=number of bits in the array of a Bloom filter, n=size of the set for which the Bloom filter is computed and k=different hash functions applied to the elements of the set.

Figure 4:
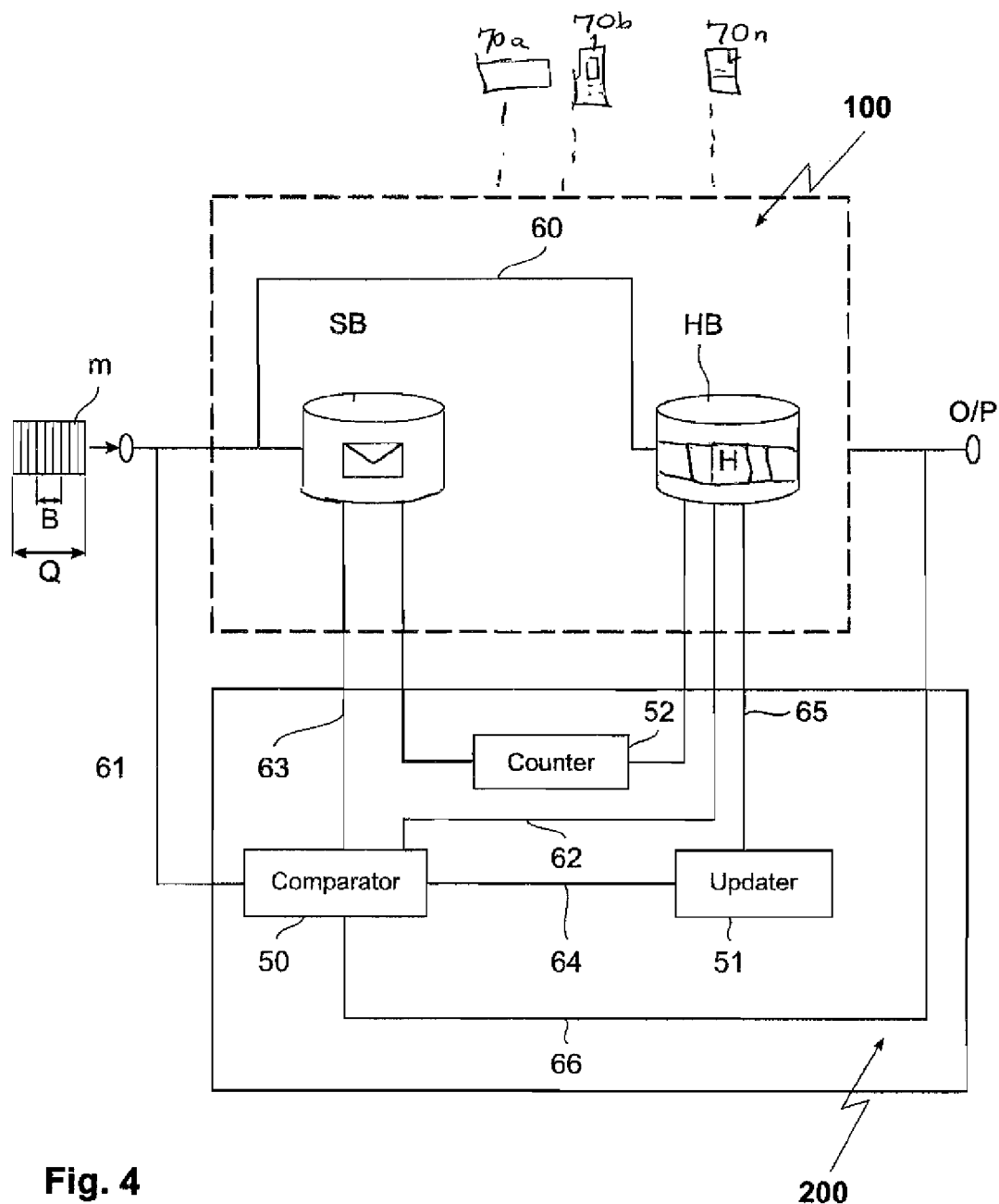

Reference will now be made to FIG. 4, which shows an embodiment of the present invention, wherein an apparatus 200 for identifying an unwanted short message service (SMS) message from SMS messages received by a cellular mobile communication system 100 is provided. As previously described, the cellular mobile communication system 100 comprises a history database HB for storing messages received by the cellular mobile communication system 100. Message transmittal line 60 is used to convey those messages in the queue Q received by the cellular mobile communication system 100 to be stored in the history database HB in the present example. The cellular mobile communication system 100 also comprises a spam database SB for storing messages identified as spam messages by the apparatus 200. In the present example, the spam database SB is assumed to be populated with at least one message identified as spam according to the procedure described with reference to FIGS. 1 and 2.

When in use, the apparatus 200 is coupled to the cellular mobile communication system 100. The cellular communication system may communicate with a plurality of cellular mobile communication devices, 70a, 70b, 70n. In the example shown in FIG. 4, coupling of the apparatus 200 to the cellular mobile communication system 100 is done via coupler 61, which couples the comparator 50 of the apparatus 200 to the input port of the cellular mobile communication system 100. The comparator 50 is also connectable to the history database HB via connector 62 and the spam database SB via connector 63. The comparator 50 is operable to measure a difference in an information content between a SMS message m received by the cellular mobile communication system 100 and at least one message in the spam database SB. If an exact match is obtained, then the message m is marked as such by the comparator 50 and discarded. If no match is found, then the message m is compared to the set H of messages stored in the history database HB, this being done as hereinbefore described with reference to FIGS. 1 and 2.

In particular, if the result that the information content of the incoming message m is more than the predefined threshold value is obtained, this result is conveyed to the updater 51, which is part of the apparatus 200, by the comparator 50 via conveyor line 64. The updater 51 updates the history database HB with the message m for its future use in processing other messages for spam identification via updater line 65. The comparator 50 also transmits the message m to the output port of the cellular mobile communication system 100 via line 66 from where it is transmitted on as a legitimate message to a user.

As can be seen from FIG. 4, the apparatus 200 further comprises a counter 52 connectable to the spam database SB and the history database HB. The counter 52 is operable to discard at least some of the messages stored in the history database HB and/or the spam database SB after a predefined time.

The comparator 50 may, in a specific implementation, be operable to measure the difference in an information content between an incoming message m and messages in the spam database SB and history database HB using the Hamming distance-Bloom-filter implementation described with reference to FIG. 3.

Although the apparatus 200 is shown as being separate to the cellular mobile communication system 100 in FIG. 4, it may alternatively be provided as being integral to the cellular mobile communication system. The apparatus 200 may be implemented in hardware and/or software.

Each feature disclosed in the description, and (where appropriate) the claims and drawings may be provided independently or in any appropriate combination.

The present invention has been described above purely by way of example, and modifications of detail can be made within the scope of the invention.

The invention claimed is:

1. A method of identifying an unwanted short message service (SMS) message from SMS messages received by a cellular mobile communication system, which comprises at least a history database (HB) for storing a set (H) of the messages received by the cellular mobile communication system, the method comprising the steps of:
    comparing contents of an incoming SMS message (m) to the contents of a set (H) of stored messages stored in a history database (HB) to determine similarity between the incoming message and the stored messages;
    measuring a difference in an information content between an SMS message (m) received by the cellular mobile communication system and the set (H) of messages stored in the history database (HB), and
    identifying the incoming message as spam and marking the SMS message (m) as being an unwanted SMS message if the difference that is measured is less than or equal to a predefined threshold value, whereby spam is identified even when the contents of an incoming message do not exactly match any predefined spam terms.

2. A method of identifying an unwanted short message service (SMS) message as claimed in claim 1, further comprising the step of:
    updating the messages stored in the history database (HB) with the SMS message (m) if the difference in the information content between the SMS message (m) and the set (H) of messages stored in the history database (HB) is measured to be more than the predefined threshold value.

3. A method of identifying an unwanted short message service (SMS) message as claimed in claim 1, wherein the cellular mobile communication system further comprises a spam database (SB) for storing unwanted messages, the method further comprising the steps of:
    measuring a difference in the information content between the SMS message (m) received by the cellular mobile communication system and at least one unwanted message (sl) stored in the spam database (SB), and
    if they are found to be identical, marking the SMS message (m) as an unwanted message.

4. A method of identifying an unwanted short message service (SMS) message as claimed in claim 1 further comprising the step of discarding at least some of the messages stored in the history database (HB) after a predefined time.

5. A method of identifying an unwanted short message service (SMS) message as claimed in claim 1, further comprising the step of sampling the messages received by the cellular mobile communication system for inclusion in the history database (HB).

6. A method of identifying an unwanted short message service (SMS) message as claimed in claim 1 wherein, in the step of measuring the difference in the information content between the SMS message (m) received by the cellular mobile communication system and the set (H) of messages stored in the history database (HB), the set (H) of messages comprises a subset of the messages stored in the history database (HB).

7. A method of identifying an unwanted short message service (SMS) message as claimed in claim 6 wherein the number of messages in the subset is selected to be a function of a time-budget.

8. A method of identifying an unwanted short message service (SMS) message as claimed in claim 1, wherein:
the difference in the information content between the SMS message (m) and a message occurring with a predetermined frequency in the set (H) of messages stored in the history database (HB) is measured.

9. A method of identifying an unwanted short message service (SMS) message as claimed in claim 1, wherein:
the difference in the information content between the SMS message (m) and the messages in the set (H) of messages stored in the history database (HB) is measured, and
if the difference that is measured is less than or equal to a predefined threshold value for a predefined number of messages in the set (H) of messages stored in the history database (HB), then the SMS message (m) is marked as an unwanted SMS message.

10. A method of identifying an unwanted short message service (SMS) message as claimed in claim 1 wherein, in the step of measuring the difference in the information content between the SMS message (m) received by the cellular mobile communication system and the set (H) of messages stored in the history database (HB):
a Hamming distance between a bloom filter computed for the SMS message (m) and a bloom filter computed for a message in the set (H) of messages stored in the history database (HB) is measured.

11. A method of identifying an unwanted short message service (SMS) message as claimed in claim 1 wherein, in the step of measuring the difference in the information content between the SMS message (m) received by the cellular mobile communication system and the set (H) of messages stored in the history database (HB):
a Hamming distance between a bloom filter computed for the SMS message (m) and a bloom filter computed for at least a part of a message in the set (H) of messages stored in the history database (HB) is measured.

12. A method of identifying an unwanted short message service (SMS) message as claimed in claim 10:
if the Hamming distance is measured to be less than or equal to a predefined threshold value for a user-defined number of messages in the set (H) of messages stored in the history database (HB), then the SMS message (m) is marked as an unwanted message.

13. A method of identifying an unwanted short message service (SMS) message as claimed in claim 11:
if the Hamming distance is measured to be less than or equal to a predefined threshold value for a user-defined number of messages in the set (H) of messages stored in the history database (HB), then the SMS message (m) is marked as an unwanted message.

14. An apparatus for identifying an unwanted short message service (SMS) message from SMS messages received by a cellular mobile communication system, the apparatus, when in use, being coupled to the cellular mobile communication system that comprises at least a history database (HB) for storing a set (H) of the messages received by the cellular mobile communication system, the apparatus comprising:
a comparator for comparing contents of an incoming SMS message (m) to the contents of a set (H) of stored messages stored in a history database (HB) to determine similarity between the incoming message and the stored messages, for measuring a difference in an information content between an SMS message (m) received by the cellular mobile communication system and the set (H) of messages stored in the history database (HB), for comparing that difference to a predefined threshold value, for identifying the incoming message as spam if the difference that is measured is less than or equal to a predefined threshold value, whereby spam is identified even when the contents of an incoming message do not exactly match any predefined spam terms.

15. An apparatus for identifying an unwanted short message service (SMS) message from SMS messages received by a cellular mobile communication system as claimed in claim 14 further comprising:
an updater operable to update the messages stored in the history database (HB) with the SMS message (m) if the difference in the information content between the SMS message (m) and the set (H) of messages stored in the history database (HB) is measured to be more than the predefined threshold value.

16. An apparatus for identifying an unwanted short message service (SMS) message from SMS messages received by a cellular mobile communication system as claimed in claim 14, the cellular mobile communication system further comprising a spam database (SB) for storing unwanted messages, wherein:
the comparator is operable to measure a difference in an information content between an SMS message (m) received by the cellular mobile communication system and at least one unwanted message in the spam database (SB) of the cellular mobile communication system.

17. An apparatus for identifying an unwanted short message service (SMS) message from SMS messages received by a cellular mobile communication system as claimed in claim 14 further comprising:
a counter operable to discard at least some of the messages stored in the history database (HB) after a predefined time.

18. An apparatus for identifying an unwanted short message service (SMS) message from SMS messages received by a cellular mobile communication system as claimed in claim 14 wherein the comparator is operable to:
compute a Bloom filter for the SMS message (m) received by the cellular mobile communication system and a message in the set of messages (H) stored in the history database (HB), respectively, and
measure a Hamming distance between the computed bloom filters.

19. A cellular mobile communication system comprising:
a plurality of cellular mobile communication devices;
at least one database comprising a history database (HB) for storing a set (H) of the messages received by the cellular mobile communication system,
at least one apparatus for identifying an unwanted short message service (SMS) message from SMS messages received by the cellular mobile communication system, the apparatus, when in use, being coupled to the cellular mobile communication system and comprising a comparator for comparing contents of an incoming SMS message (m) to the contents of a set (H) of stored messages stored in a history database (HB) to determine similarity between the incoming message and the stored messages, for measuring a difference in an information content between an SMS message (m) received by the cellular mobile communication system and the set (H) of messages stored in the history database (HB), for comparing the measured difference to a predefined threshold value, and for identifying the incoming message as spam if the difference that is measured is less than or equal to a predefined threshold value, whereby spam is identified even when the contents of an incoming message do not exactly match any predefined spam terms.

20. A computer program storing a program readable by a computer for performing a method of identifying an unwanted short message service (SMS) message from SMS messages received by a cellular mobile communication system, which comprises at least a history database (HB) for storing a set (H) of the messages received by the cellular mobile communication system, the method comprising the steps of:
- comparing contents of an incoming SMS message (m) to the contents of a set (H) of stored messages stored in a history database (HB) to determine similarity between the incoming message and the stored messages;
- measuring a difference in an information content between an SMS message (m) received by the cellular mobile communication system and the set (H) of messages stored in the history database (HB), and
- identifying the incoming message as spam and marking the SMS message (m) as being an unwanted SMS message if the difference that is measured is less than or equal to a predefined threshold value, whereby spam is identified even when the contents of an incoming message do not exactly match any predefined spam terms.

* * * * *